US012037814B2

(12) United States Patent
Hörberg et al.

(10) Patent No.: US 12,037,814 B2
(45) Date of Patent: Jul. 16, 2024

(54) ELECTROMECHANICAL LOCK ASSEMBLY WITH ANNULAR ELEMENT, BLOCKING AND RETAINING DEVICES

(71) Applicant: Swedlock AB, Halmstad (SE)

(72) Inventors: Johan Hörberg, Halmstad (SE); Magnus Nilsson, Varberg (SE); Martin Lindvall, Simlångsdalen (SE)

(73) Assignee: Swedlock AB, Halmstad (SE)

( * ) Notice: Subject to any disclaimer, the term of this patent is extended or adjusted under 35 U.S.C. 154(b) by 322 days.

(21) Appl. No.: 17/754,267

(22) PCT Filed: Oct. 1, 2020

(86) PCT No.: PCT/SE2020/050922
§ 371 (c)(1),
(2) Date: Mar. 29, 2022

(87) PCT Pub. No.: WO2021/066718
PCT Pub. Date: Apr. 8, 2021

(65) Prior Publication Data
US 2022/0372795 A1 Nov. 24, 2022

(30) Foreign Application Priority Data
Oct. 3, 2019 (SE) .................................... 1951131-0

(51) Int. Cl.
*E05B 47/06* (2006.01)
*E05B 27/00* (2006.01)
(Continued)

(52) U.S. Cl.
CPC ...... *E05B 47/0653* (2013.01); *E05B 27/0042* (2013.01); *E05B 35/001* (2013.01);
(Continued)

(58) Field of Classification Search
CPC ............. E05B 47/0006; E05B 47/0653; E05B 47/0611; E05B 47/0626; E05B 47/063;
(Continued)

(56) References Cited

U.S. PATENT DOCUMENTS

2013/0014552 A1* 1/2013 Bench ................ E05B 47/0673 70/393
2019/0218826 A1 7/2019 Allen et al.
2020/0318392 A1 10/2020 Barnett, III et al.

FOREIGN PATENT DOCUMENTS

DE 3602989 A1 11/1987
DE 4416318 C1 * 5/1995 ........... E05B 47/063
(Continued)

OTHER PUBLICATIONS

Extended European Search Report mailed Aug. 29, 2023, issued in corresponding EP Application No. 2087124.5, filed Oct. 1, 2020, 5 pages.
(Continued)

*Primary Examiner* — Christine M Mills
*Assistant Examiner* — Christopher F Callahan
(74) *Attorney, Agent, or Firm* — Christensen O'Connor Johnson Kindness PLLC

(57) ABSTRACT

The present invention relates to an electromechanical lock assembly (1) comprising a lock body (15), a lock core (17), a lock bolt operating member (19), and an electronic access control device. The electromechanical lock assembly further comprises an annular element (27) which is rotatably and axially displaceably mounted on said lock core (17), a coupling device (25) arranged to communicate with said electronic access control device and, upon the insertion of an appropriate key (65) in a key receptacle (37) of the lock core (17), rotationally lock the annular element (27) to the lock core (17), thereby enabling rotation of the lock core (17) in a first direction and thereby enabling unlocking of a lock (3)
(Continued)

with said appropriate key (65), and a blocking arrangement (63) arranged to prevent unauthorized unlocking of said lock (3).

12 Claims, 7 Drawing Sheets

(51) Int. Cl.
*E05B 35/00* (2006.01)
*E05B 47/00* (2006.01)

(52) U.S. Cl.
CPC .. *E05B 47/0006* (2013.01); *E05B 2047/0063* (2013.01); *E05B 2047/0085* (2013.01)

(58) Field of Classification Search
CPC ............. E05B 47/0638; E05B 47/0646; E05B 47/0649; E05B 27/0042; E05B 35/001; E05B 35/007; E05B 2047/0063; E05B 2047/0084; E05B 2047/0085; E05B 33/00; E05B 19/0052
See application file for complete search history.

(56) References Cited

FOREIGN PATENT DOCUMENTS

| | | | | | |
|---|---|---|---|---|---|
| DE | 102005041974 | B3 | * | 12/2006 | ......... E05B 27/0042 |
| DE | 102005041974 | B3 | | 12/2006 | |
| DE | 102006012196 | B3 | * | 8/2007 | ........... E05B 47/063 |
| DE | 102006012196 | B3 | | 8/2007 | |
| EP | 0243586 | A2 | | 11/1987 | |
| EP | 1148189 | A1 | | 10/2001 | |
| EP | 1 531 216 | A2 | | 5/2005 | |
| EP | 1960622 | A2 | | 8/2008 | |
| EP | 2441906 | A2 | | 4/2012 | |
| JP | 11264267 | A | | 9/1999 | |
| JP | 4035224 | B2 | | 1/2008 | |
| KR | 20080002594 | U | | 7/2008 | |
| WO | WO-2004057137 | A1 | * | 7/2004 | ......... E05B 47/0649 |
| WO | WO-2007069047 | A2 | * | 6/2007 | ......... E05B 47/0642 |
| WO | 2018075605 | A1 | | 4/2018 | |

OTHER PUBLICATIONS

International Search Report and Written Opinion mailed Dec. 18, 2020, issued in corresponding International Patent Application No. PCT/SE2020/050922, filed Oct. 1, 2020, 12 pages.

* cited by examiner

ELECTROMECHANICAL LOCK ASSEMBLY WITH ANNULAR ELEMENT, BLOCKING AND RETAINING DEVICES

TECHNICAL FIELD

The present invention relates to an electromechanical lock assembly, which is configured to be powered by insertion of a programmable key in a key receptacle, said lock assembly comprising a lock body, a lock core located at least partially within the lock body and selectively rotatable with respect to the lock body, the lock core including a key receptacle for receiving a programmable key, a lock bolt operating member rotationally secured to the lock core and configured to move a lock bolt of a lock for locking and unlocking said lock, and an electronic access control device.

BACKGROUND

EP 1 960 622 B2 shows an electromechanical locking system that comprises a lock core, a tailpiece and an electrically-operated clutch mechanism for rotatably coupling the tailpiece to the lock core. Further, the lock core includes a keyway for a key having an electrical power source and electrical connection means which provides an electrical connection with the electrical power source of the key.

However, this electromechanical locking system is considered to be complex, which render it cumbersome to manufacture, assemble and use with different kind of lock sets.

SUMMARY OF THE INVENTION

An object of the present invention is to at least partly overcome the above-mentioned drawbacks and to provide an improved electromechanical lock assembly.

According to a first aspect of the invention, this and other objects are achieved, in full or at least partly, by an electromechanical lock assembly, which is configured to be powered upon insertion of a programmable key in a key receptacle, said lock assembly comprising a lock body, a lock core located at least partially within the lock body and selectively rotatable with respect to the lock body, the lock core including a key receptacle for receiving a programmable key, a lock bolt operating member rotationally secured to the lock core and configured to move a lock bolt of a lock for locking and unlocking said lock, and an electronic access control device, wherein the lock assembly further comprises an annular element which is rotatably and axially displaceably mounted on said lock core, a coupling device arranged to communicate with said electronic access control device and, upon the insertion of an appropriate key in the key receptacle, rotationally lock the annular element to the lock core, thereby enabling rotation of the lock core and thereby enabling locking and unlocking of said lock with said appropriate key, and a blocking arrangement comprising a retaining device arranged to prevent said annular element from rotating together with said lock core when the lock core is rotated with an inappropriate key, one contact surface situated on the lock core, one contact surface situated on said annular element and a stationary blocking member, wherein said contact surfaces being configured to, upon rotation of said lock core relative to said annular element, axially move said annular element into engagement with said stationary blocking member, thereby blocking further rotation of the lock core and thereby prevent unauthorized locking and unlocking of said lock.

Upon the insertion of an appropriate key, the coupling device thus couples the annular element to the lock core, which prevents the lock core from rotating together relative to the annular element and thereby enables locking and unlocking rotation of the lock core. The coupling device thus serves to enable locking and unlocking rotation of the lock core and the lock operating member which is arranged to rotate together with the lock core. The annular element is maintained in a non-blocking position as long as an appropriate key is inserted in the key receptacle. The lock core is formed as an integral part and the lock bolt operating member is never disengaged from the lock core. In this solution there is thus no need to rotationally couple separate parts of a lock core. This enables a simple solution having few parts and that is easy to manufacture and assemble. Also, it provides for a solution that can be used together with different types of lock sets in an easy manner. Furthermore, this solution allows the use of an electrical actuator to be minimized, which provides for a very power efficient solution.

If the lock core is rotated using an inappropriate key, the annular element is moved into a blocking position, in which it engages each of the lock core and the stationary blocking member. Then, the annular element, blocks further rotation of the lock core. In this manner, the blocking arrangement blocks unauthorized locking and unlocking rotation of the lock core, and consequently unauthorized locking and unlocking of an associated lock, in a robust and reliable manner. The blocking arrangement thus provides for a very robust and reliable solution.

Hence, especially in view of to EP 1 960 622, a less complex solution having fewer parts may be achieved. Furthermore, a solution in which the lock core and lock operating member rotate instantly when using an appropriate key is archived. Also, a solution in which the lock core cannot be rotated more than just a few degrees with an inappropriate key, is provided Furthermore, the electromechanical lock assembly may require the need of an electrical actuator under only a very short period of time. This has the advantage that the assembly requires very little power to operate.

According to one embodiment the coupling device comprises an electric actuator arranged to move a coupling member from a rest position, in which it allows the lock core to rotate relative to the annular element, to a coupling position in which it rotationally locks said annular element to said lock core.

The coupling device may thus comprise an electric actuator, such as e.g. a solenoid, having a coupling member being movable between a rest position, in which the movable member is situated when the electric actuator is powerless, and a coupling position, in which the coupling member is situated when the electric actuator is powered and in which it rotationally locks the annular element to the lock core.

According to one embodiment the annular element is movable between a non-blocking position, to which it is biased by a biasing member, and a blocking position.

According to one embodiment the coupling member is pivotable or rotatable between said rest position and said coupling position. In this embodiment a coupling member in the form of a pivotable arm or a rotatable disc may thus be used.

According to one embodiment the coupling member is linearly displaceable between said rest position and said coupling position. In this embodiment a coupling member in the form of a linearly displaceable rod may thus be used.

According to one embodiment the electric actuator is a solenoid, which has the advantage that an assembly with very low power consumption may be achieved.

According to one embodiment said retainer device comprises a retaining member which is received in a recess formed in the annular element, which provides for a very robust and reliable solution.

According to one embodiment said retaining member is a ball and preferably a spring biased ball.

According to one embodiment said recess is an axial groove.

According to one embodiment the lock assembly further comprises an axial movement limiting device arranged to limit axial movement of the annular element relative to the lock core. The axial movement limiting device thus maintains the annular element rotationally coupled to the lock core. This allows for an assembly with even less power consumption, since the electrical actuator need to be powered only in the initial phase of the rotation of the lock core, i.e. under a very short period of time when rotation of the lock core relative to the annular element is initiated. The axial movement limiting device is thus arranged to maintain the annular element in a non-blocking position.

According to one embodiment the axial movement limiting device comprises at least one ball received in a radial groove formed in the annular element, which provides for a very robust and reliable solution.

According to one embodiment the lock body is cylindrical.

Further advantages and characteristics of the invention emerge from the description below and from the following patent claims.

BRIEF DESCRIPTION OF THE DRAWINGS

The invention will be described in more detail with reference to the appended schematic drawings, which show examples of presently preferred embodiments of the invention.

DESCRIPTION OF PREFERRED EMBODIMENTS

Figure 1:
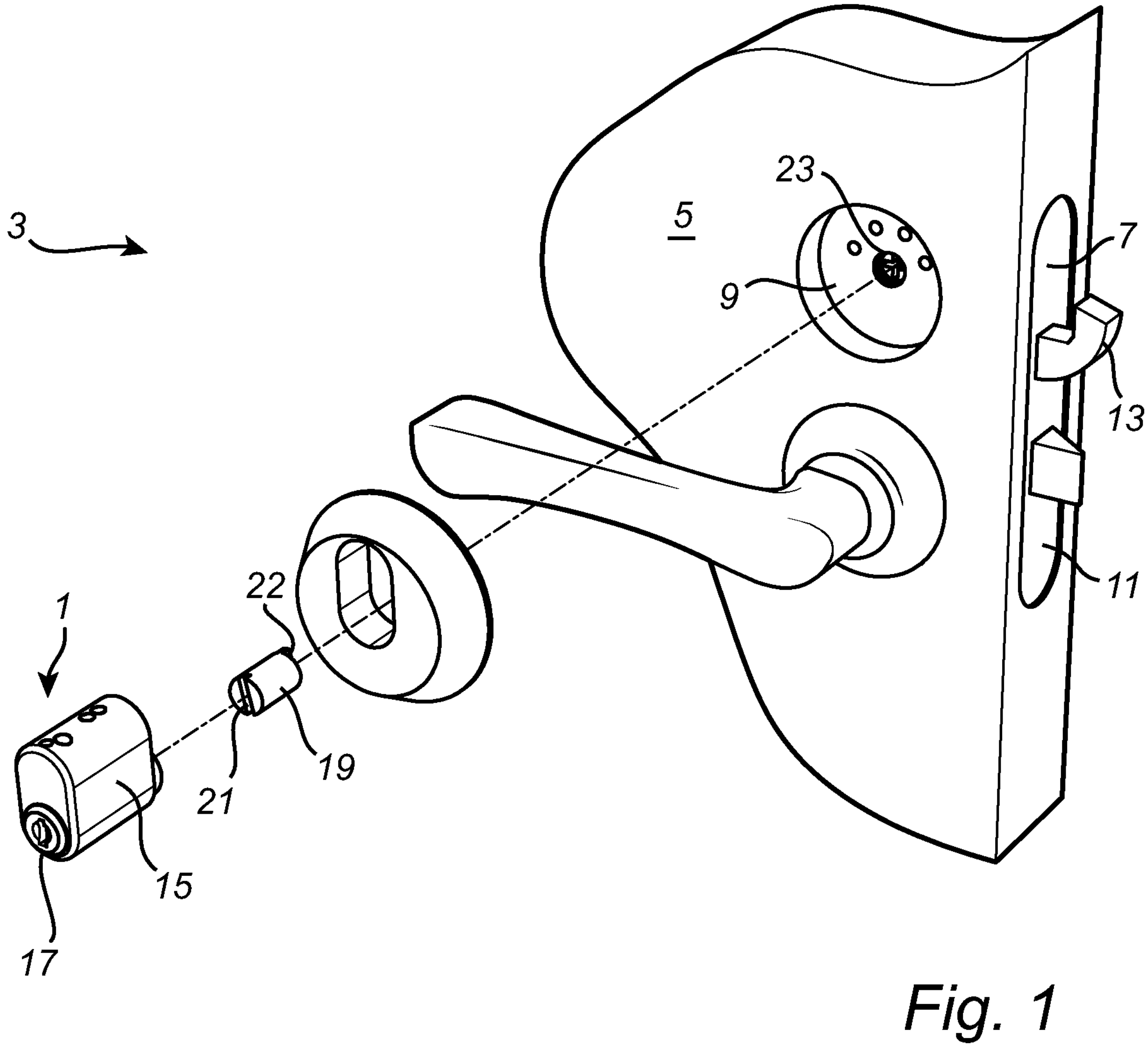
FIG. 1 is an exploded view showing an electromechanical lock assembly according to a first embodiment of the invention.

The invention will now for the purpose of exemplification be described in more detailed by means of examples and with reference of the accompanying drawings, in which currently preferred embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1 illustrates an electromechanical lock assembly, in the form of an electromechanical lock cylinder 1, according to a first embodiment of the invention that forms part of an electromechanical lock 3 arranged at a door 5.

The electromechanical lock cylinder 1 is connected to an existing locking mechanism 7 of the electromechanical lock 3. The door 5 may be a front door to a building such as a house or to an apartment. The electromechanical lock cylinder 1 is arranged in connection with a first bore 9 on the exterior side of the door 5 and an interior locking device (not shown), like a knob, on the interior side of the door 5.

As in a common door, having a door lock, a lock housing 11 holding the locking mechanism 7 is arranged in a cavity of the door 5. The locking mechanism 7 and the lock housing 11 are of common sort, which are well known in the art, and not described in detail here. The locking mechanism 7 may be of any kind known in the art which is arranged in a lock housing in a cavity of a door 5. As is also well known in the art, the locking mechanism 3 cooperates, via a lock bolt 13 with a striking plate (not shown) arranged in a door frame (not shown) to lock the door 5. The locking mechanism 7 controls the lock bolt 13 via the electromechanical lock cylinder 1 from the exterior side of the door 5 and via the interior locking device from the interior side of the door 5 in a well known manner. The locking mechanism 7 is coupled to the lock bolt 13 by a conventional coupling means (not shown) so as to actuate the lock bolt 13.

The electromechanical lock cylinder 1 comprises a lock body, in the form of a cylinder body 15, a lock core 17 located within the cylinder body 15 and a lock bolt operating member 19. The lock core 17 is selectively rotatable with respect to the cylinder body 15. A fixing device is arranged to prevent the lock core 17 from being retracted from the cylinder body 13. This fixing device may comprise balls (not shown) partly received in a radial groove (not shown) formed in the cylinder body 13 and partly received in a radial groove 18 formed in the lock core 17. The lock bolt operating member 19 is rotationally secured to the lock core 13. To this end the lock operating member 19 is provided with a recess 21 configured to receive a projecting portion (not shown) of the lock core 17. The lock bolt operating member 19 is thus arranged to rotate together with the lock core 17. The lock bolt operating member 19 is configured to operate the lock bolt 13 of the locking mechanism 7 for locking and unlocking the lock 3. To this end, the lock bolt operating member 19 has a projecting portion 22 which is arranged to be received in a recess 23 of the locking mechanism 7.

Figure 2:
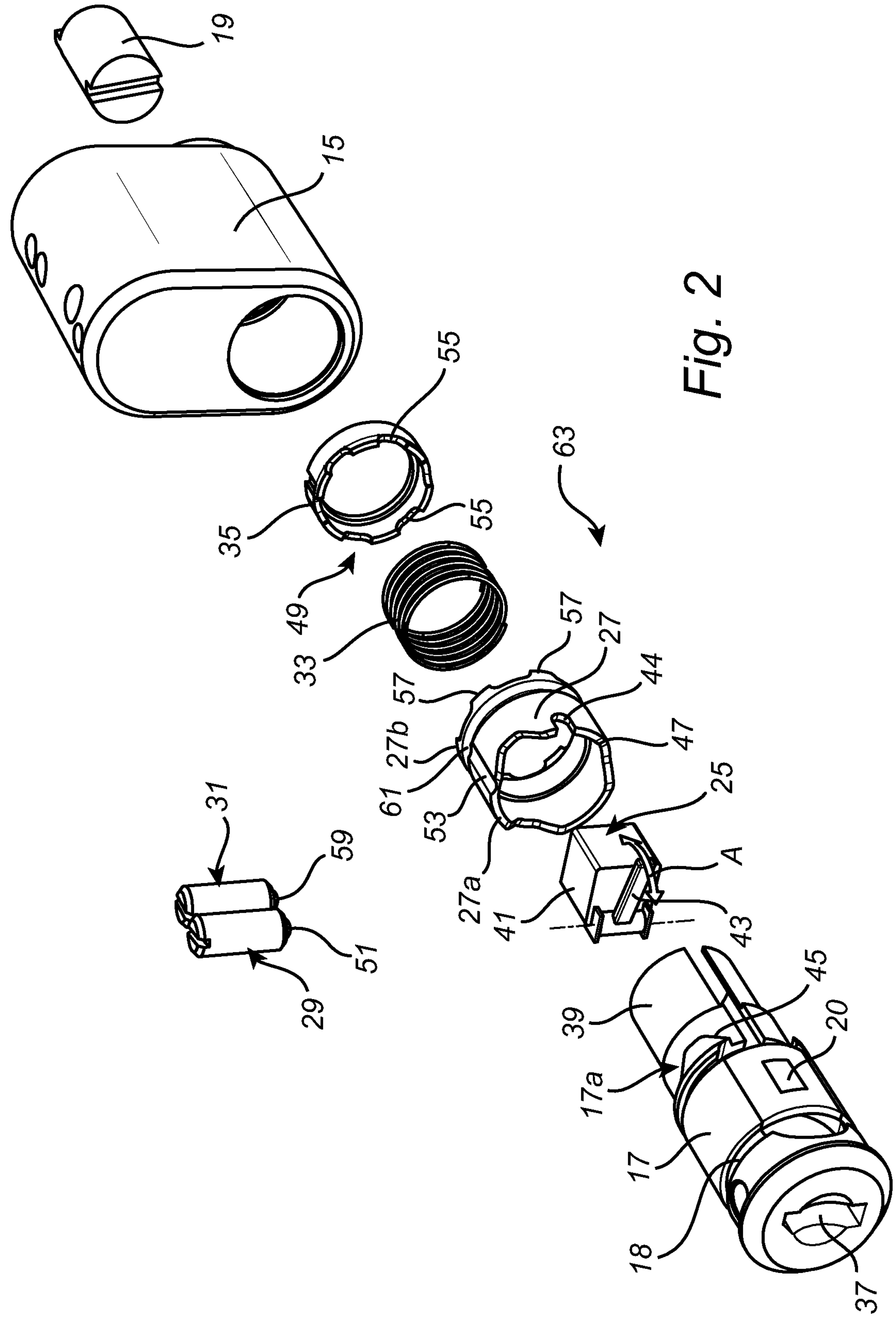
FIG. 2 is an exploded view showing parts of the electromechanical lock assembly shown in FIG. 1.

Now referring to FIG. 2, the electromechanical lock cylinder 1 comprises the cylinder body 15, the lock core 17, a coupling device 25, an annular element 27, a retainer device 29, an axial movement limiting device 31, a biasing member in the form of a spring 33, and a stationary blocking member 35. The lock core 17, which is formed as an integral part, comprises a key receptacle 37 for receiving a programmable key. Such a programmable key, which is used to operate an electromechanical lock, comprises an energy source, such as a battery, and a control unit powered by the energy source. The key can access a cloud based or locally hosted access control system which transfer authorization data to the key or log information from the key via internet and a synchronization unit or via a mobile communication system such as the GSM net and a mobile device, such as a mobile phone. In one embodiment the mobile device is the key itself. The key is accessed from the synchronization unit or the mobile device by a physical contact, by near field communication, such as NFC, or by radio communication, such as Bluetooth. The key can store all data necessary to access at least one specific electromechanical key lock, but cannot access any electromechanical locks for which it does not have the appropriate authorization data. Locking and unlocking of a lock using the programmable key is rendered possible only if the programmable key is synchronized appropriately via the synchronization unit or a mobile device. Further, such a programmable key is provided with means by which electrical power, data and mechanical effort can be transmitted to the lock in a known manner. The electromechanical lock cylinder 1 is configured to be powered by and communicate with such a programmable key upon the insertion of the key in the key receptacle 37. To this end the electromechanical lock cylinder 1 comprises power receiving means, communication means and an electrical control unit. The electromechanical lock cylinder 1 further comprises an access control device 20 for controlling access of a key inserted in the key receptacle 37. Also, the key receptacle 37 of the lock core 17 is configured such that the lock core 17 rotates together with a programmable key.

The annular element 27 is rotatably and axially displaceably mounted on the hollow lock core portion 39. The coupling device 25 is accommodated inside the hollow lock core portion 39 and secured thereto so as to rotate together therewith. The coupling device 25 is arranged to, upon the insertion of an appropriate key in the key receptacle 37, rotationally couple the annular element 27 to the lock core 17. To this end the coupling device 25 comprises an electric actuator 41 which is configured to communicate with the access control device. The electric actuator 41 has a pivotable arm 43, as illustrated by arrow A in FIG. 2. The pivotable arm 43 is movable between a rest position, in which rotation of the annular element 27 relative to the lock core 17 is allowed, and a coupling position in which the annular element 27 is rotationally coupled to the lock core 17 by the coupling arm 43. To this end the annular element 27 has a coupling recess 44 which is configured to receive the coupling arm 43 of the coupling device 25.

The coupling device 25 is thus arranged to, upon the insertion of an appropriate key in the key receptacle 37, rotationally lock the annular element 27 to the lock core 17, which enables locking and unlocking rotation of the lock core 17 and thereby enables locking and unlocking of the lock 3, as will be described in detail later with reference to FIGS. 3A-C.

A first end of the annular element 27 forms an engagement portion 27*a* which is configured to mate an engagement portion 17*a* of the lock core 17. The engagement portion 17*a* of the lock core 17 comprises a first contact surface forming a first ramp surface 45 and the engagement portion 27*a* of the annular element 27 comprises a second contact surface forming a second ramp surface 47. The first and second ramp surfaces 45, 47 together form a sliding interface capable of, upon rotation of the lock core 17 relative to the annular element 27, axially displacing the annular element 27 in a direction toward the stationary blocking member 35 into engagement with an engagement portion thereof. Upon such engagement further rotation of the lock core 17 is prevented. To this end a second end of the annular element 27 is provided with a blocking portion 27*b* configured to engage the engagement portion 49 of the stationary blocking member 35. The annular element 27 is thus movable between a non-blocking position, to which it is biased by the spring 33, and a blocking position. The annular element 27 is biased against the lock core 17 by the spring 33 to secure that the ramp surfaces 45, 47 of the sliding interface always are in contact with each other.

The first retainer device 29 is arranged to prevent the annular element 27 from rotating together with the lock core 17 when it is rotated with an inappropriate key, i.e. when the coupling arm 43 is situated in the rest position. To this end the first retainer device 29 comprises a spring biased ball 51 which is received in an axial groove 53 formed in the annular element 27.

The stationary blocking member 35, which in this case is formed by a ring, is secured to the cylinder body 15. The engagement portion 49 of the sleeve 35 comprises axially extending recesses 55 facing the blocking portion 27*b* of the annular element 27. The recesses 55 of the stationary blocking member 35 are configured to interact with teeth 57 of the blocking portion 27*b* of the annular element 27. In this embodiment the stationary blocking member 35 is thus formed as a separate part which is secured to the cylinder body 15 and thereby stationary. It is however appreciated that a stationary brake/blocking member may be formed as projecting portion(s) of the cylinder body itself.

The axial movement limiting device 31 is arranged to prevent axial movement of the annular element 27 upon rotation of the lock core 17 with an appropriate key. To this end the axial movement limiting device 31 comprises a spring biased ball 59 which is received in an axial groove 61 formed in the annular element 27.

The ramp surfaces 45, 47, the first retainer device 29, the blocking portion 27*b* of the annular sleeve 27 and the engagement portion 51 of the stationary blocking member 35 together form part of a blocking arrangement 63 that serves to prevent unauthorized rotation of the lock core 17 and thereby prevent unauthorized locking and unlocking of the lock 3.

With reference to FIGS. 3A-C and FIGS. 4A-C, the function of the electromechanical lock cylinder 1 will now be described.

Figure 3A:
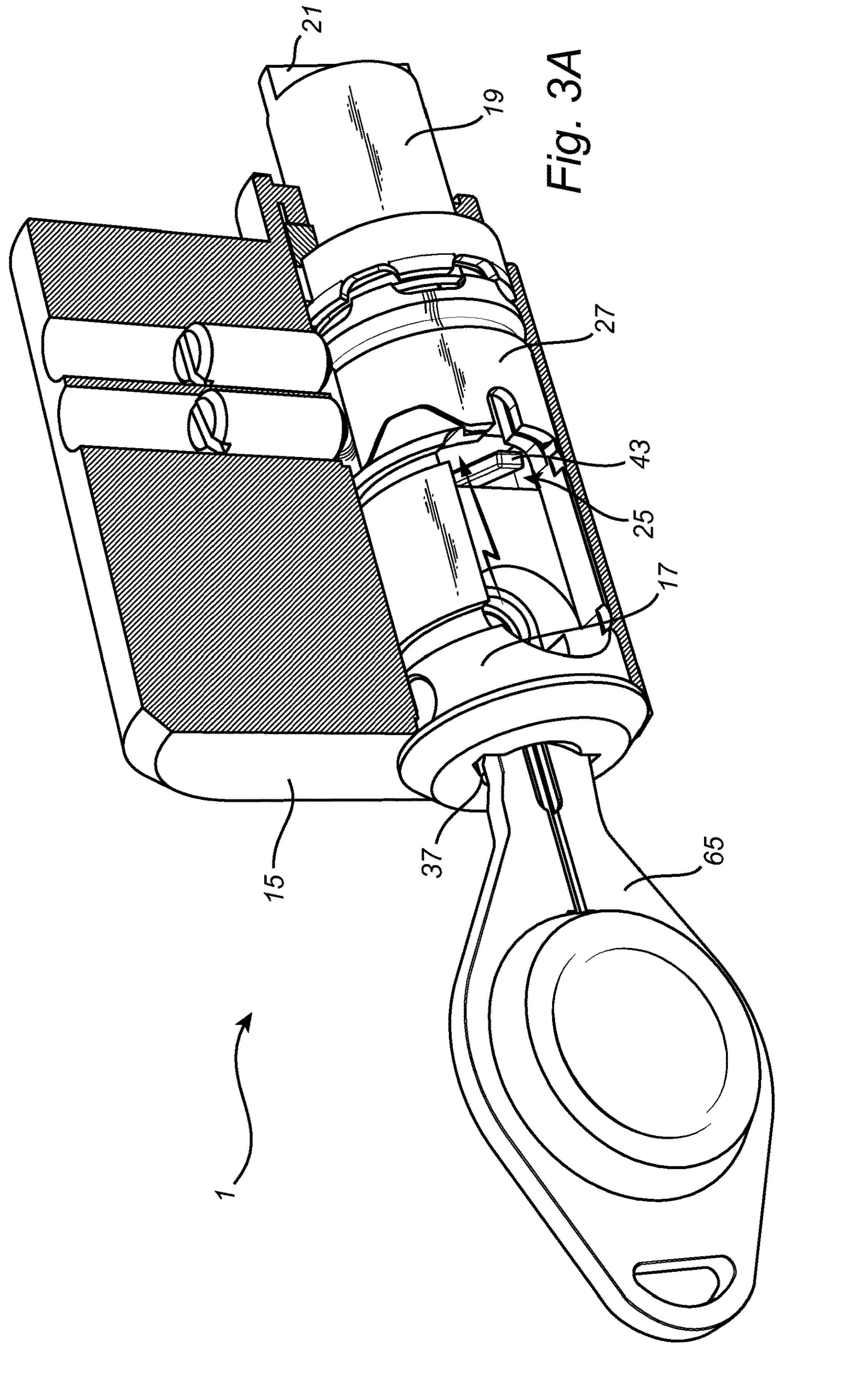
FIGS. 3A-C are a partly cross-sectional perspective views and illustrate the function of the electromechanical lock cylinder when an appropriate key is inserted in a key receptacle thereof.
Figure 3B:
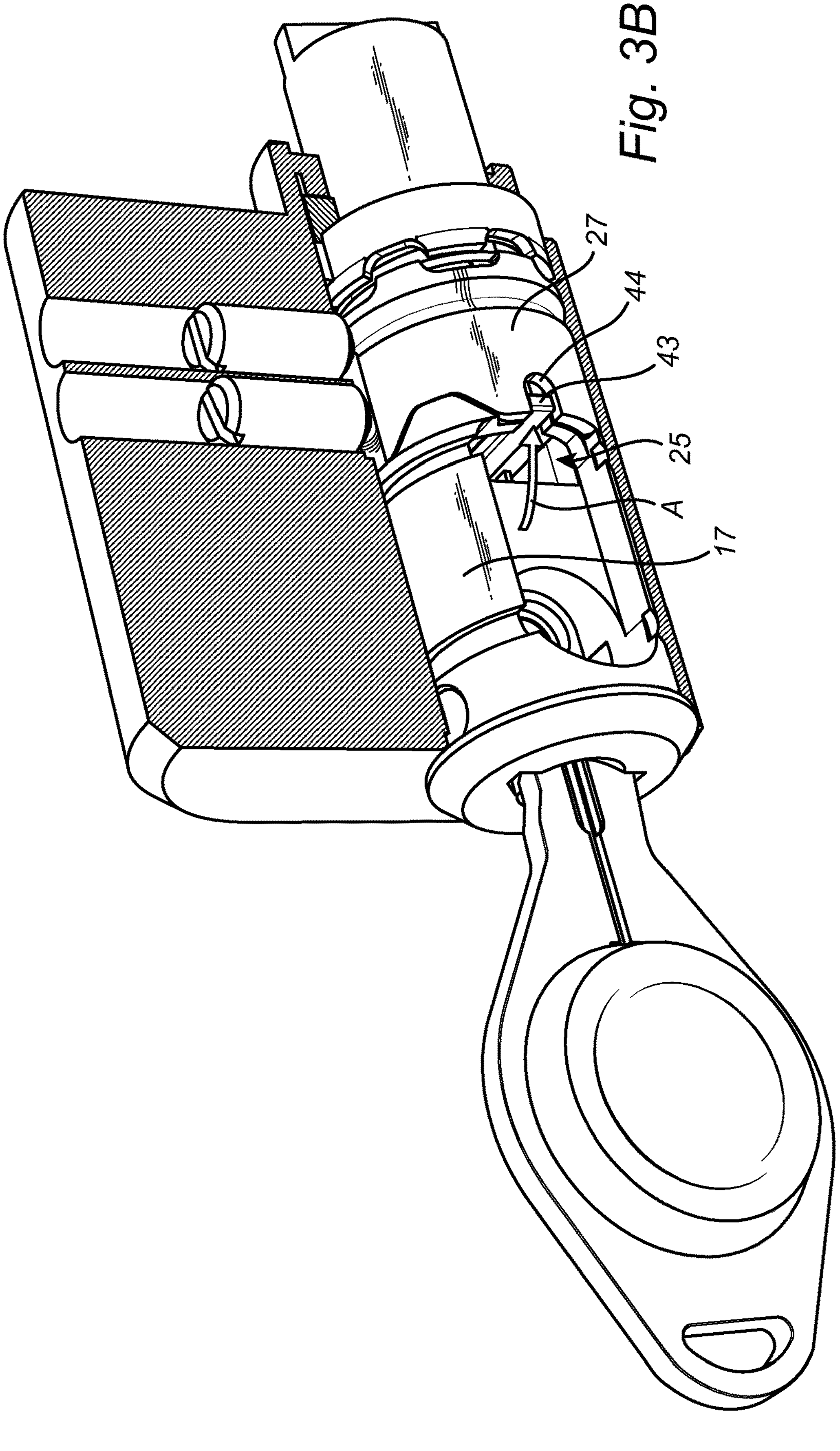
Figure 3C:
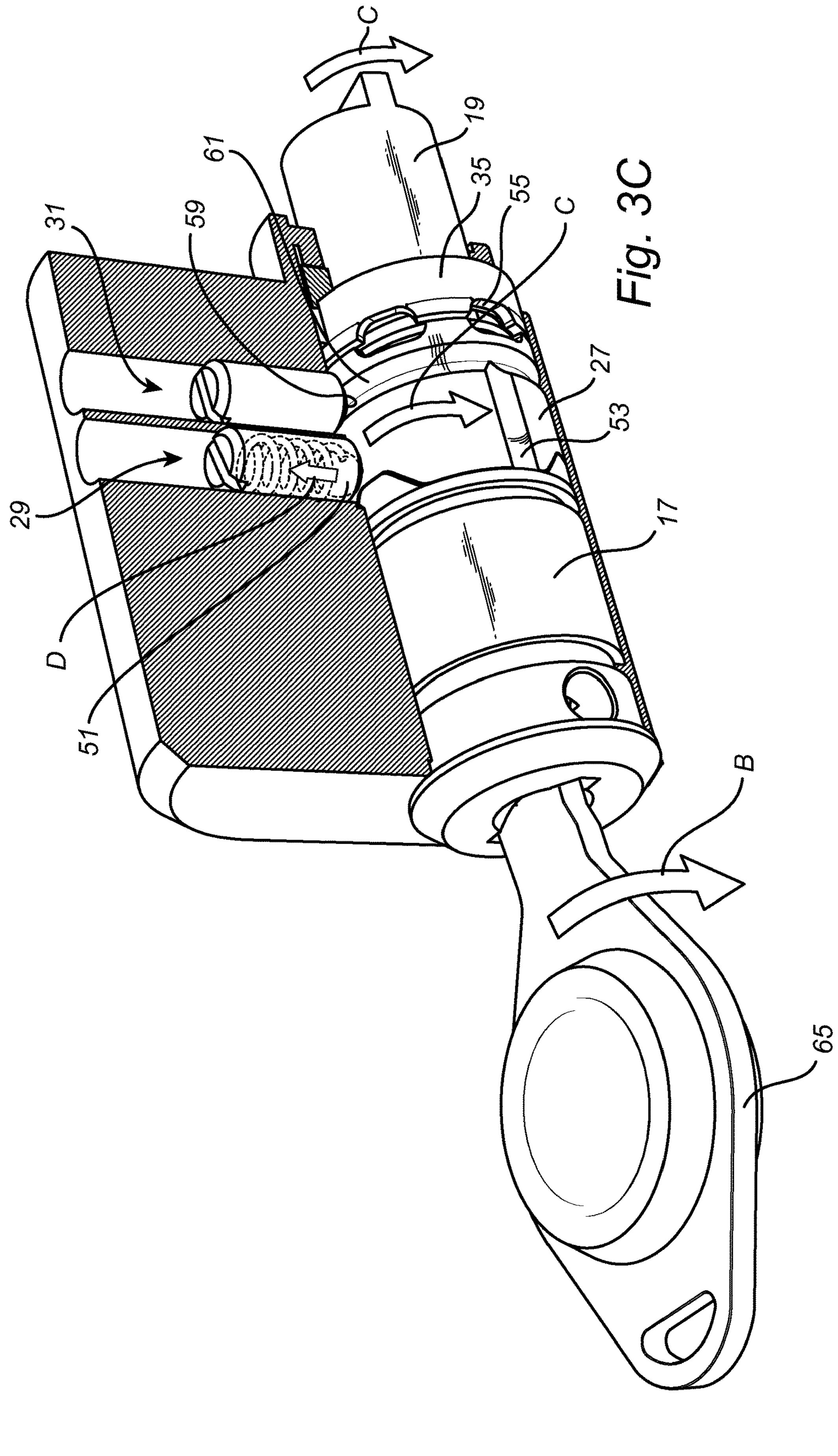

FIG. 3A illustrates a state in which an appropriate key 65 is inserted in the key receptacle 37 of the lock core 17 and the lock core 17 is situated in a position which corresponds to a locked state of the electromechanical lock 3. Then, the projecting portion 21 of the lock bolt operating member 19 typically extends in a vertical direction. Upon insertion of the key 65 in the key receptacle 37 power is transferred to a power receiving means (not shown) of the lock core 17 for powering of the electromechanical lock cylinder 1. Also, the access control device controls whether it is an appropriate key or not. In case an appropriate key 65 is inserted, as in this case, the electric actuator 41 is activated whereby the coupling arm 43 thereof is moved from its rest position, illustrated in FIG. 3A, to its coupling position, in which it is received in the coupling recess 44 of the annular element 27, as illustrated by arrow A in FIG. 3B. Then, the annular element 27 is rotationally coupled to the lock core 17. Turning of the key 65, as illustrated by arrow B in FIG. 3C, then causes the annular element 27 to rotate together with the lock core 17 and the lock operating member 19, as illustrated by arrows C in FIG. 3C, thereby enabling unlocking of the lock 3. Upon turning of the appropriate key 65 the spring biased ball 51 of the retainer device 29 is displaced form the axial groove 53, as illustrated by arrow D in FIG. 3C.

When the coupling arm 43 is moved to the coupling position, rotation of the lock core 17 to unlock the lock 3 is thus enabled. The coupling arm 43 may be held in the coupling position during the complete rotation of the lock core 17 during unlocking of the lock 3 or during only an initial phase thereof. In the latter case, the coupling arm 43 need to be held in the coupling position until the retaining member 51 of the retaining device 29 has been displaced from its retaining position in the axial groove 53.

Upon rotation of the lock core 17 using the appropriate key 65, the ball 59 of the axial limiting device 31 is received in the radial groove 61 to prevent axial movement of the annular element 27. The axial movement limiting device 31 thereby secures that the blocking teeth 57 of the annular element 27 are separated from the recesses 55 of the stationary blocking element 35 upon rotation of the lock core 17 with an appropriate key 65. The axial limiting device 31 serves to minimize the use of the coupling device 25. Hence, thanks to the axial limiting device 31 the electrical actuator of the coupling device 25 need to be powered only in an initial phase of the rotation of the lock core 17, i.e. under a very short period of time, which is allows for an assembly with a very low power consumption. The electromechanical lock cylinder 3 thus comprises an electric actuator, which may be in the form of a solenoid, to enable rotation of the lock core 17 so as to unlock the lock 3.

Figure 4A:
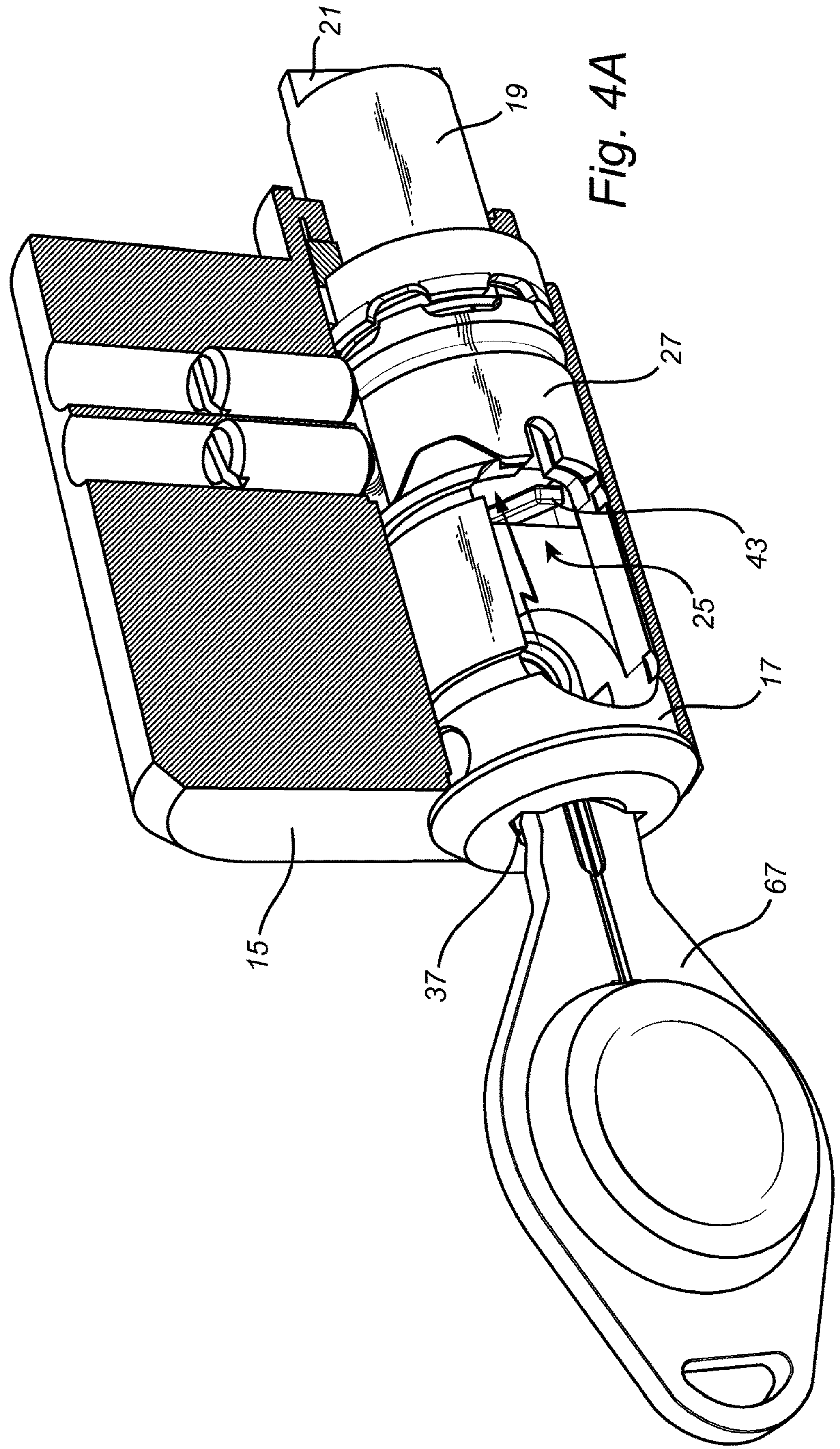
FIGS. 4A-B are a partly cross-sectional perspective views and illustrate the function of the electromechanical lock cylinder when an inappropriate key is inserted in a key receptacle thereof.
Figure 4B:
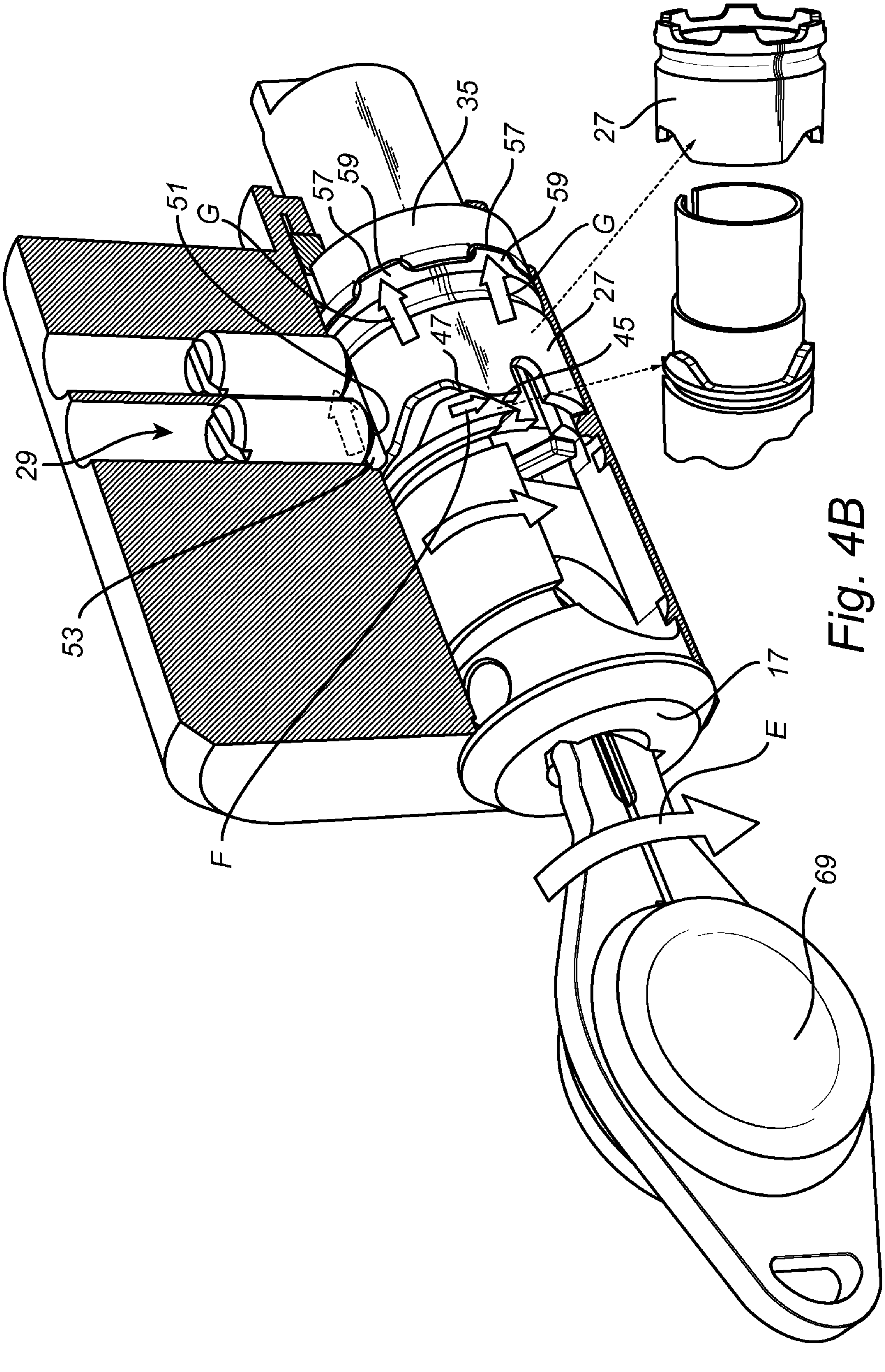

FIG. 4A illustrates a state in which an inappropriate key 67 is inserted in the key receptacle 37 of the lock core 17 and the lock core 17 is situated in a first position which corresponds to a locked state of the electromechanical lock 3 and in which the projecting portion 21 of the lock bolt operating member 19 extends in a vertical direction.

Upon insertion of the inappropriate key 67 in the key receptacle 37 power is transferred to the lock core 17 in the same manner as described hereinbefore with reference to FIG. 3A. Also, the access control device controls whether it is an appropriate key or not. In this case, in which an inappropriate key 67 is inserted, the coupling device 25 is not activated. The coupling arm 43 then remains in the rest position which position is illustrated in FIG. 4A. Then, rotation of the lock core 17 relative to the annular element 27 is possible, as illustrated by arrow F in FIG. 4B. Rotation of the lock core 17 relative the annular element 27 is enabled by the retainer device 29, the retaining ball 51 of which prevents the annular element 27 from rotating with the lock core 17. The spring biased ball 51, which is received in the axial groove 53, thus prevents the annular element 27 from rotating as the lock core 17 rotates. Turning of the key 67, as illustrated by arrow E in FIG. 4B, then causes the ramp surface 45 of the lock core 17 to slide against the ramp surface 47 of the annular element 27 and thereby the annular element 27 to move into engagement with the stationary blocking element 35, as illustrated by arrows G in FIG. 4B, thereby preventing further rotation of the lock core 17 in the actual direction. Unlocking of the lock 3 is then prevented. More specifically, upon axial movement of the annular sleeve 27 caused by rotation of the lock core 17 using an inappropriate key 67, the teeth 59 of the annular element 27 are moved into the recesses 57 of the stationary blocking member 35, which results in mechanical engagement that blocks further rotation of the lock core 17. Hence, upon rotation of the lock core 17 with the coupling arm 43 in the rest position, the retaining ball 51 of the retainer device 29 prevents the annular element 27 to rotate together with the lock core 17. Then, the ramp surfaces 45, 47 slide relative each other and cause the annular element 27 to move axially in a direction towards the stationary member 35 until the engagement portion **27*b* engages the engagement portion 49 of the stationary blocking member 35. Then, further rotation of the lock core 17 is mechanically blocked by the ramp surfaces 45, 47 and the teeth 59 received in the blocking recesses 57. Upon axial movement of the annular element 27 the retaining ball 51 is displaced, in the axial groove, relative to the lock core 17, as illustrated by the dotted arrow in FIG. 4**B.

It will be appreciated that many variants of the above-described embodiments are possible within the scope of the appended patent claims.

The invention claimed is:

1. Electromechanical lock assembly, which is configured to be powered upon insertion of a programmable key in a key receptacle, said lock assembly comprising a lock body, a lock core located at least partially within the lock body and selectively rotatable with respect to the lock body, the lock core including a key receptacle for a receiving a programmable key, a lock bolt operating member rotationally secured to the lock core and configured to move a lock bolt of a lock for locking and unlocking said lock, and an electronic access control device, an annular element which is rotatably and axially displaceably mounted on said lock core, a coupling device arranged to communicate with said electronic access control device and, upon the insertion of an appropriate key in the key receptacle, rotationally lock the annular element to the lock core, thereby enabling rotation of the lock core and thereby enabling locking and unlocking of said lock with said appropriate key, and a blocking arrangement comprising a retaining device arranged to prevent said annular element from rotating together with said lock core when the lock core is rotated with an inappropriate key, one contact surface situated on the lock core, one contact surface situated on said annular element and a stationary blocking member, wherein said contact surfaces being configured to, upon rotation of said lock core relative to said annular element, axially move said annular element into engagement with said stationary blocking member, thereby blocking further rotation of the lock core and thereby prevent unauthorized locking and unlocking of said lock.

2. Electromechanical lock assembly according to claim 1, wherein said coupling device comprises an electric actuator arranged to move a coupling member from a rest position, in which it allows lock core to rotate relative to the annular element, to a coupling position in which it rotationally locks said annular element to said lock core.

3. Electromechanical lock assembly according to claim 2, wherein said annular element is movable between a non-blocking position, to which it is biased by a biasing member, and a blocking position.

4. Electromechanical lock assembly according to claim 2, wherein said coupling member is pivotable or rotatable between said rest position and said coupling position.

5. Lock assembly according to claim 3, wherein said coupling member is linearly displaceable between said rest position and said coupling position.

6. Lock assembly according to claim 2, wherein said electric actuator is a solenoid.

7. Electromechanical lock assembly according to claim 1, wherein said retainer device comprises a retaining member which is received in a recess formed in the annular element.

8. Electromechanical lock assembly according to claim 7, wherein said retaining member is a ball and preferably a spring biased ball.

9. Electromechanical lock assembly according to claim 7, wherein said recess is an axial groove.

10. Electromechanical lock assembly according to claim 1, wherein the lock assembly further comprises an axial movement limiting device arranged to limit axial movement of the annular element relative to the stationary blocking member, thereby preventing the annular element to be moved into engagement with the stationary blocking member.

11. Electromechanical lock assembly according to claim 10, wherein said axial movement limiting device comprises at least one ball received in a radial groove formed in the annular element.

12. Electromechanical lock assembly according to claim 1, wherein said lock body is cylindrical.

* * * * *